United States Patent
Squillante et al.

(10) Patent No.: US 7,454,410 B2
(45) Date of Patent: Nov. 18, 2008

(54) METHOD AND APPARATUS FOR WEB CRAWLER DATA COLLECTION

(75) Inventors: Mark Steven Squillante, Pound Ridge, NY (US); Joel Leonard Wolf, Katonah, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 10/434,653

(22) Filed: May 9, 2003

(65) Prior Publication Data
US 2004/0225642 A1   Nov. 11, 2004

(51) Int. Cl.
*G06F 17/30* (2006.01)
(52) U.S. Cl. .................................. 707/3; 707/2; 707/5
(58) Field of Classification Search .................. 707/2, 707/3, 5; 715/513
See application file for complete search history.

(56) References Cited

OTHER PUBLICATIONS

Wolf, et al., "Optimal Crawling Strategies for Web Search Engines," Proceedings of the 11th International Conference on World Wide Web, Session: Crawling, pp. 136-147, May 8, 2002.*
The Eleventh International World Wide Web Conference, "Schedule-at-a-Glance," printed on Oct. 7, 2005 from http://www.unizh.ch/home/mazzo/reports/www2002conf/program/schedule.html, 5 pages.*
Lavrenko et al., "Relevance-Based Language Models," SIGIR'01, Sep. 9-12, 2001, pp. 120-127.*
Meretakis et al., "Extending Naive Bayes Classifiers Using Long Itemsets," KDD-99, 1999, pp. 165-174.*

* cited by examiner

*Primary Examiner*—Apu Mofiz
*Assistant Examiner*—Kavita Padmanabhan
(74) *Attorney, Agent, or Firm*—F. Chau & Associates, LLC

(57) ABSTRACT

A Web crawler data collection method is provided for collecting information associated with a plurality of queries, which is used to calculate estimates of return probabilities, clicking probabilities and incorrect response probabilities. The estimated return probabilities relate to a probability that a search engine will return a particular Web page in a particular position of a particular query result page. The estimated clicking probabilities relate to a frequency with which a client selects a returned Web page in a particular position of a particular query result. The estimated incorrect response probabilities relate to the probability that a query to a stale version of a particular Web page yields an incorrect or vacuous response. Further, information may be collected regarding the characteristics and update time distributions of a plurality of Web pages.

14 Claims, 7 Drawing Sheets

METHOD AND APPARATUS FOR WEB CRAWLER DATA COLLECTION

CROSS REFERENCE TO RELATED APPLICATIONS

This application is related to "Method and Apparatus for Search Engine World Wide Web Crawling," by Squillante et al., copending U.S. patent application Ser. No. 10/434,971 filed herewith, which is incorporated by reference herein in its entirety.

BACKGROUND OF THE INVENTION

1. Field of the Invention

The present invention relates generally to information searching, and more particularly, to techniques for providing efficient search engine crawling.

2. Background of the Invention

In "Method and Apparatus for Search Engine World Wide Web Crawling," by Squillante et al., copending U.S. patent application Ser. No. 10/434,971, a two-part scheme is disclosed for optimizing the Web crawling process. That invention involves a technique to schedule the crawler process to minimize an important metric: search engine embarrassment. Search engine embarrassment relates to the frequency with which a client makes a search engine query and then clicks on a returned link (or otherwise selects the URL) only to find that the result is incorrect, or worse, that the Web page no longer exists. The first part of the above-mentioned invention determines the optimal crawling frequencies, as well as the theoretically optimal times to crawl each Web page. It does so under an extremely general distribution model of Web page updates, one which includes both generalized stochastic and generalized deterministic update patterns. The second part employs these frequencies and ideal crawl times, creating an optimal achievable schedule for the crawlers.

The above-mentioned patent application depends crucially on the ability of the search engine apparatus to gather and maintain appropriate data as input. Accordingly, there is a need for methods to collect data to ensure that accurate data is input for the Web crawling process.

SUMMARY OF THE INVENTION

According to an aspect of the invention, there is provided a method for Web crawler data collection. The method includes the step of collecting information associated with a plurality of queries, the information related to results of the queries and/or responses to the queries. Estimates of return probabilities, clicking probabilities and incorrect response probabilities are then calculated at least in part based on the collected information.

The estimated return probabilitues relate to a probability that a search engine will return a particular Web page in a particular position of a particular query result page. The estimated clicking probabilities relate to a frequency with which a client selects a returned Web page in a particular position of a particular query result. The estimated incorrect response probabilities relate to the probability that a query to a stale version of a particular Web page yields an incorrect or vacuous response.

The collected information can include sampled information. However, the estimates of the clicking probabilities may either be based on sampling or determined based on a model. For instance, a model may determine an initial estimate of the clicking probabilities using a modified Zipf's Law distribution.

According to another aspect of the invention, the method further includes collecting information about the characteristics and update time distributions of a plurality of Web pages. The characteristics may include whether a Web page update process is generalized stochastic or generalized deterministic in nature. The update time distributions may include probability distrubutions. In the case of a generalized stochastic update process, the update time distributions are completely general and include the corresponding update probabilities. In the case of a generalized deterministic update process, the information can include a sequence of specific times at which updates might occur together with the corresponding update probabilities.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
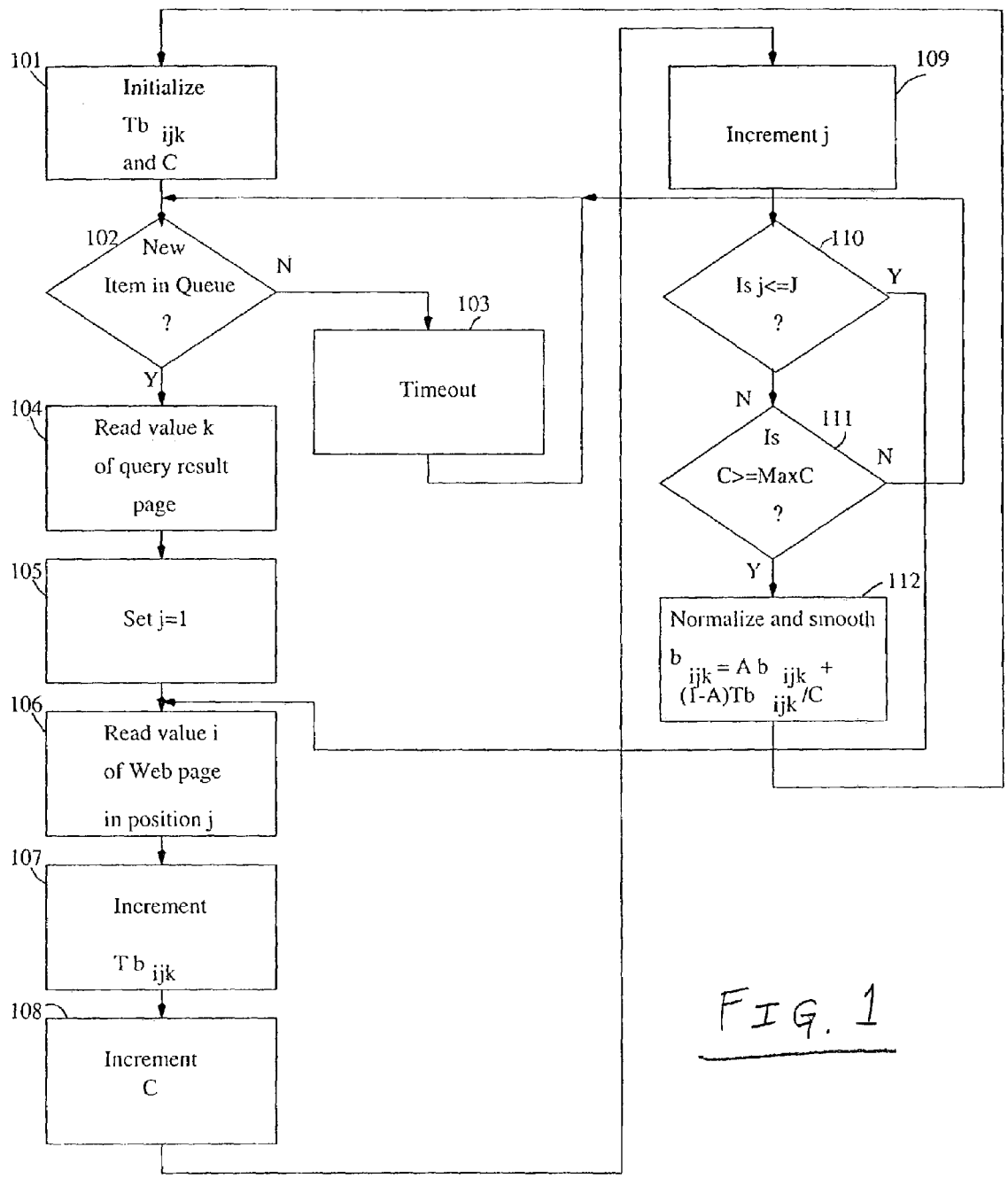
FIG. 1 is a flow diagram outlining an exemplary technique for estimating the probability that a search engine will return a particular Web page in a particular position of a particular query result page.

As discussed above, "Method and Apparatus for Search Engine World Wide Web Crawling," by Squillante et al., copending U.S. patent application Ser. No. 10/434,971, describes a two-part scheme for optimizing the Web crawling process. That invention minimizes search engine embarrassment which relates to the frequency with which a client makes a search engine query and then clicks on a returned link only to find that the result is incorrect, or worse, that the Web page no longer exists. An appendix to the present application summarizes some of the important features of that invention.

According to various exemplary embodiments of the present invention, a scheme is provided to collect data on the World Wide Web, in order to assist a search engine in deciding on the optimal crawling frequencies and the optimal times to crawl each Web page.

In particular, the collected data includes an estimate of the following information:

(1) Return Probabilities: The probability that the search engine will return a particular Web page in a particular position of a particular query result page;

(2) Clicking Probabilities: The frequency with which a client will click on a returned Web page in a particular position of a particular query result;

(3) Probabilities of Incorrect Responses: The probability that a query to a stale version of a particular Web page yields an incorrect or vacuous response (i.e., where the Web page no longer exists);

(4) Web Page Characteristics (Generalized Stochastic or Generalized Deterministic): A decision for each Web page as to whether its update process is generalized stochastic or generalized deterministic in nature;

(5) Distribution of Update Times (Generalized Stochastic Web Pages): For a generalized stochastic Web page, the distribution of the specific time values when the Web page may be updated as well as the update probabilities for each of these update times; and (6) Distribution of Update Times (Generalized Deterministic Web Pages): For a generalized deterministic Web page, the specific time values when the Web page may be updated as well as the update probabilities for each of these update times.

The schemes associated with collecting each of these six types of data are described in more detail below.

1. Estimating the Return Probabilities

This portion of the invention estimates the $b_{i,j,k}$, namely the probability that the search engine will return Web page i in position j of query result page k. The Web page indexes run over all Web pages of interest to the search engine. The positions run from 1 through J, the maximum number of Web pages returned to a client on a single query result page. The query result pages run from 1 to K, the maximum number of query result pages returned by the search engine.

This invention does not address the issue of how to perform sampling. Those skilled in the art will recognize that this problem is orthogonal to the goals of the invention, and such information is taught, for example, in *Forest Sampling Desk Reference*, by E. Johnson, CRC Press, 2000, which is incorporated by reference herein in its entirety. The method below temporarily estimates new data regarding the values of $b_{i,j,k}$ and then expontially smoothes such new data into the existing data at an appropriate time. This time can vary based on the needs of the search engine. More frequent updates yield more accurate data but incur more overhead.

FIG. 1 shows a flowchart describing a method for calculating values $b_{i,j,k}$. First, step 101 initializes the values of the temporary buffer Tb by setting $Tb_{i,j,k}=0$ for all Web pages i, positions j and query result pages k. The count value C is also initialized to 0 here. In step 102 the method examines a sample queue to see if a new query result page has arrived but not been processed. If not, control passes to step 103, where the method waits a prescribed timeout period and then returns to step 102. If so, control passes to step 104, where the value k of the query result page is read, and that query result page is removed from the sample queue. In step 105 positions is initialized to be 1. In step 106 the index i of the Web page returned in position j is evaluated. In step 107 the value $Tb_{i,j,k}$ is incremented by 1, and in step 108 the count C is incremented by 1. In step 109 the position j is incremented by 1 and in step 110 a check is made as to whether j is less than or equal to J, the maximum position on the query result page. If it is, control is passed back to step 106. If it is not, control is passed to step 111, where a check is made as to whether C is greater than or equal to MaxC, the threshold for rewriting the values of b. If not, control is passed back to step 102. If so, step 112 normalizes the values of $Tb_{i,j,k}$ by dividing them by C, and then $b_{i,j,k}$ is updated via exponential smoothing with a parameter A. Specifically, the invention replaces $b_{i,j,k}$ by $Ab_{i,j,k}+(1-A)Tb_{i,j,k}/C$. Then control is returned to step 101, and the process starts anew. This process does not normally terminate, and the values of $b_{i,j,k}$ get updated regularly.

2. Estimating the Clicking Probabilities

This portion of the invention estimates the value of $c_{j,k}$, namely the frequency that a client will click on a returned Web page in position j of query result page k. The positions run from 1 through J, the maximum number of Web pages returned to a client on a single query result page. The query result pages run from 1 to K, the maximum number of query result pages returned by the search engine.

Two equally preferred embodiments are offered. The first is based on sampling and the second based on modeling. The former is more overhead intensive but will provide better estimates. The latter has virtually no overhead and yet seems to provide quite accurate results, based on past experiments. It could also, for example, be employed until the sampling-based embodiment has had sufficient time to yield better quality results.

Again, this invention does not address the issue of how to perform sampling. Those skilled in the art will recognize that this problem is orthogonal to the goals of the invention. The sampling method below temporarily estimates new data regarding the values of $c_{j,k}$ and then expontially smoothes such new data into the existing data at an appropriate time. This time can vary based on he needs of the search engine. More frequent updates yield more accurate data but incur more overhead.

Figure 2:
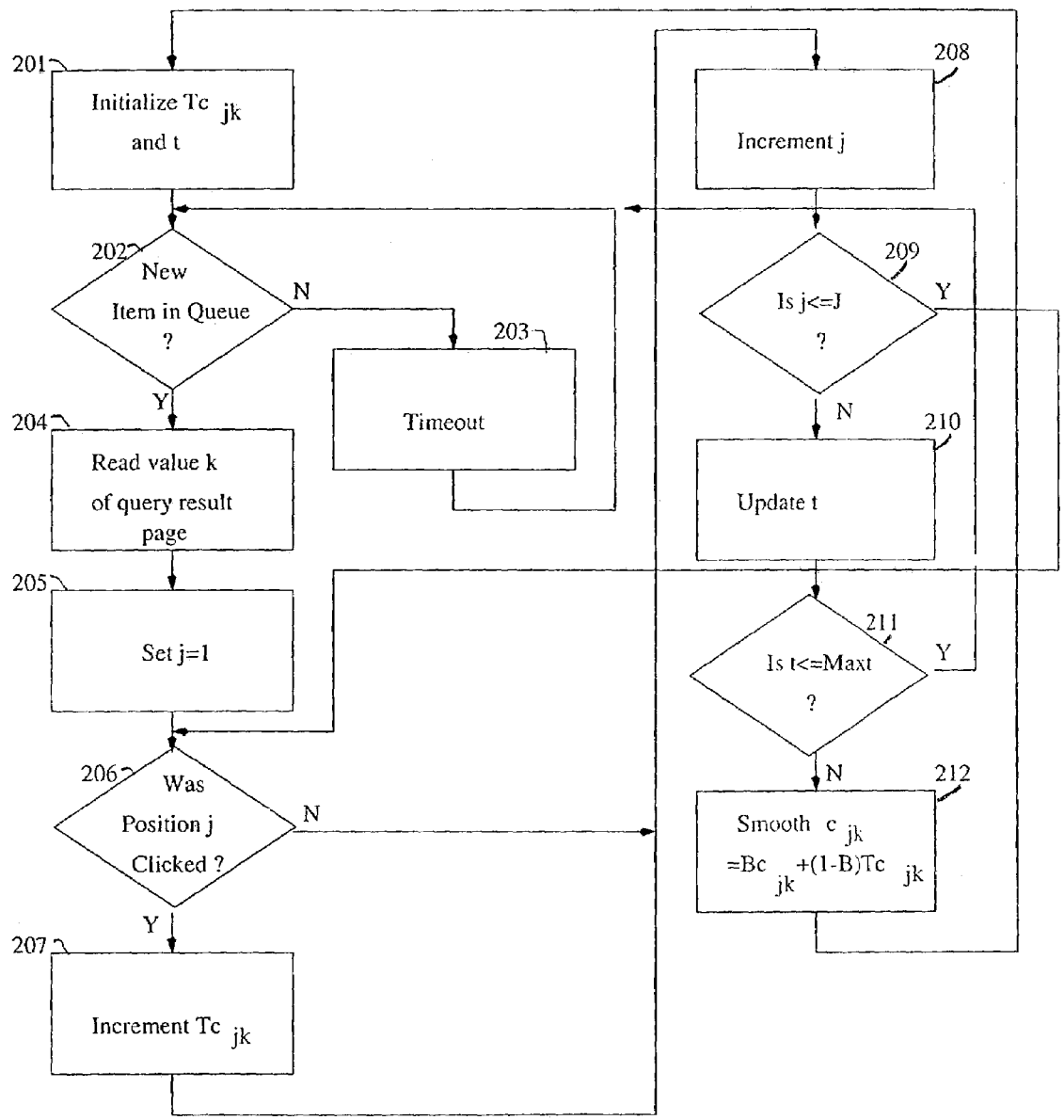
FIG. 2 is a flow diagram outlining an exemplary sampling-based technique for estimating the frequency that a client will click on a returned Web page in a particular position of a particular query result page.

FIG. 2 shows a flowchart describing a method for calculating values $c_{j,k}$. First, step 201 initializes the values of the temporary buffer Tc by setting $Tc_{j,k}=0$ for all positions j and query result pages k. The time value t is also initialized to 0 here. In step 202 the method examines the sample queue to see if a new query result page has arrived but not been processed. If not, control passes to step 203, where the method waits a prescribed timeout period and then returns to step 202. If so, control passes to step 204, where the value k of the query result page is read, and that query result is removed from the sample queue. In step 205 position j is initialized to be 1. In step 206 a check is made to see if position j was clicked by the client. If it has, step 207 increments the value of $Tc_{j,k}$ by 1 and proceeds to step 208. If it has not, the method proceeds directly to step 208. In step 208 the position j is incremented by 2 and in step 209 a check is made as to whether j is less than or equal to J, the maximum position on the query result page. If it is, control is passed step 206. If it is not, control is passed to step 210, where the time t is updated. In step 211 a check is made as to whether t is less than or equal to Maxt, the threshold for rewriting the values of c. If so, control is passed back to step 202. If not, step 212 updates the value of $c_{j,k}$ via exponential smoothing with a parameter B. Specifically, the invention replaces $c_{j,k}$ by $Bc_{j,k}+(1-B)Tc_{j,k}$. Then control is returned to step 201, and the process starts anew. This process does not normally terminate, and the values of $c_{j,k}$ get updated regularly.

A modeling alternative to this sampling approach can be used for initial estimates of the values $c_{j,k}$ of the clicking probabilities uses a modified Zipf's Law distribution. (See

*The Art of Computer Programming*, Vol. 3., by D. Knuth, Addison-Wesley, 1973, which is incorporated by reference herein in its entirety, where the distribution associated with Zipf's Law and similar distributions are taught). The modification starts with a so-called Zipf-like distribution based on parameter $\theta$. If there are a total of J positions on each of P query result pages one might expect a clicking distribution which decreases as a function of the overall position m=(j−1)*P+k and depends on the parameter $\theta$. Thus one can write $c_{j,k} \propto p^{k-1}/m^{\theta}$, where p is the probability of page turning parameter. Moreover, some clients do not know how to scroll, or do not use scrolling. Let s(j) be 1 if k>S and 0 otherwise, where S is the position on the query result page below which one must scroll. Then one can write $c_{j,k} \propto q^{s(j)} p^{k-1}/m^{\theta}$, where q is the probability of scrolling parameter. Expanding out the value of m yields the estimate that $c_{j,k} \propto q^{s(j)} p^{k-1}/((j-1)*P+k)^{\theta}$. Normalizing by use of a parameter estimating the total clicking frequency then yields the desired values of $c_{j,k}$.

Figure 3:
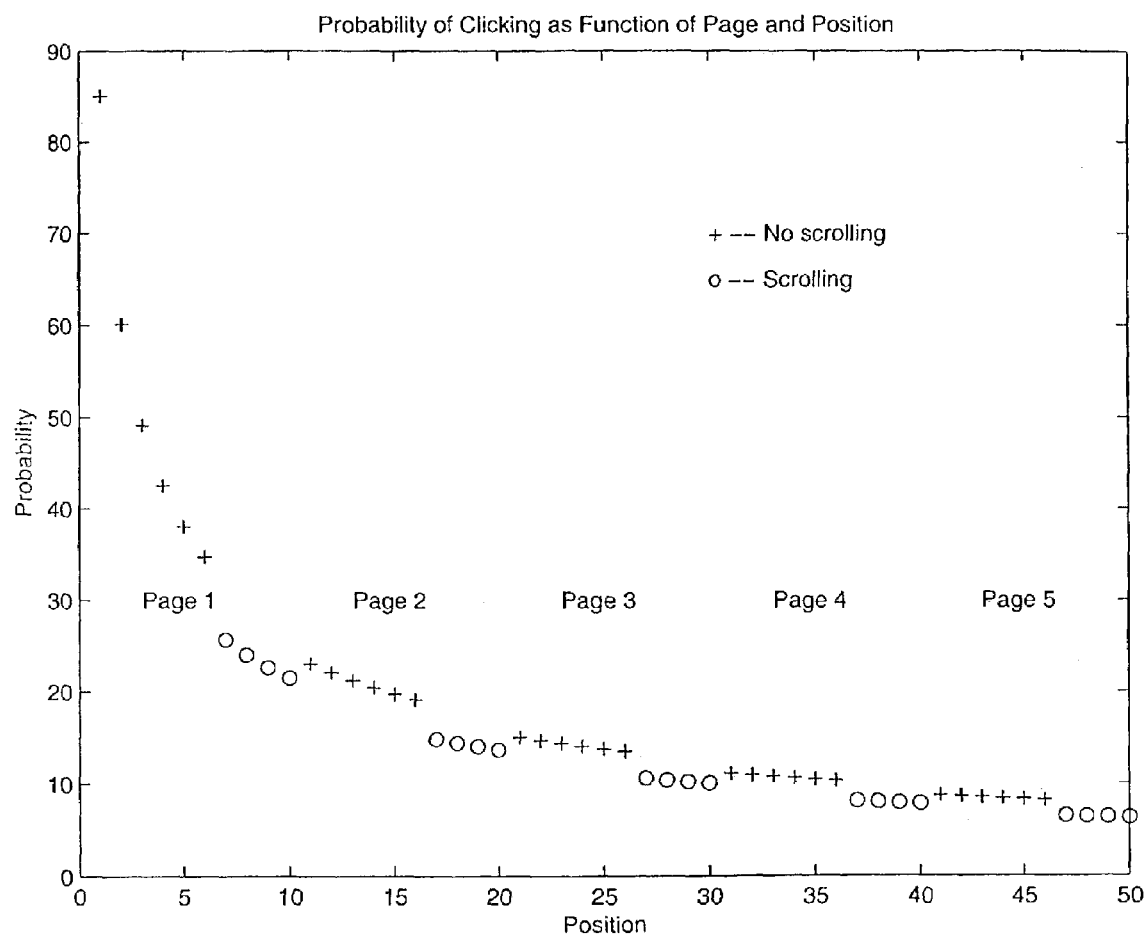
FIG. 3. illustrates examples of the clicking frequencies as a function of Web page and position, the result of a modeling-based technique for estimating these frequencies.

FIG. 3 illustrates a possible graph of the probability of clicking on a Web page as a function of its position and query result page in the search engine query results. This calculation uses the modeling method just described, with parameters K=10, P=5, $\theta$=0.5, p=0.9, S=6 and q=0.8. Note that the probability of clicking goes down smoothly up and including the 6th position within each query result page, when it drops due to (a lack of complete) scrolling. From page to page the probability of clicking also essentially goes down because of the probability of turning the page. However, the effects in this case of not scrolling outweigh the effects of not turning the query result page, so one sees a slight rise from the end of one query result page to the beginning of the next. Such behavior is quite typical.

3. Estimating the Probability of an Incorrect Response

This portion of the invention estimates the value $d_i$, namely the probability that a query to a stale version of Web page i yields an incorrect or vacuous response. The Web pages indexes run over all Web pages of interest to the search engine. Once again, this invention does not explicitly address the issue of how to perform sampling.

Figure 4:
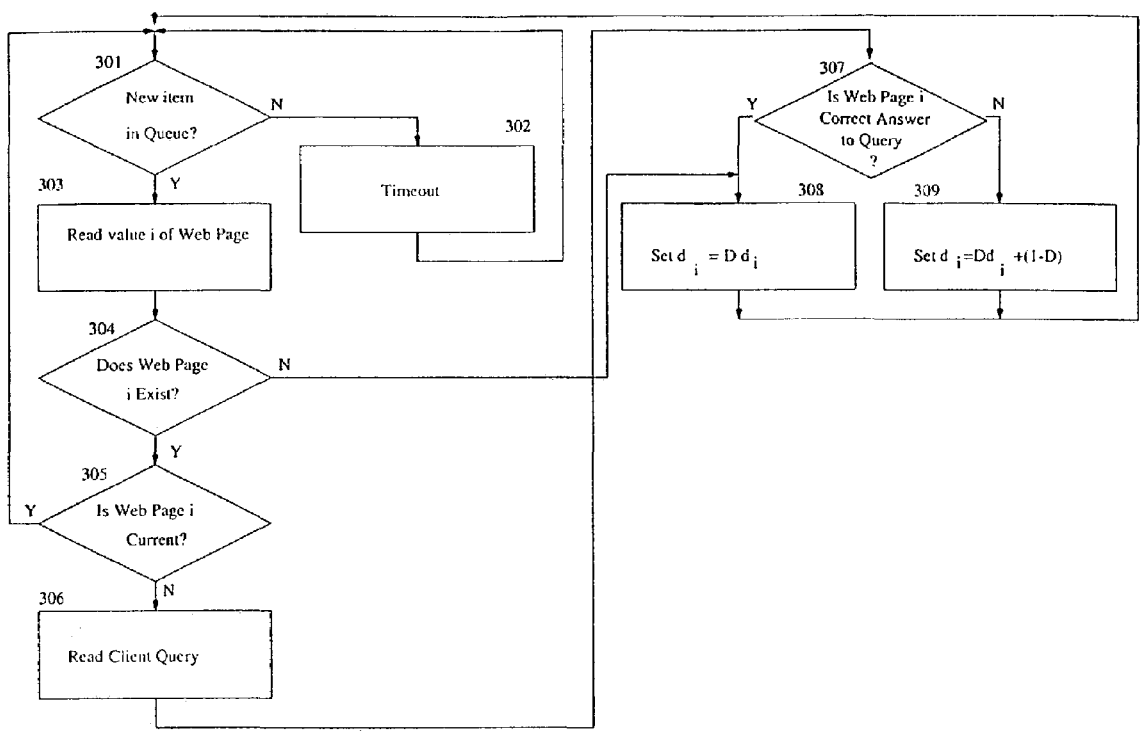
FIG. 4 is a flow outlining an exemplary technique for estimating the probability that a query to a stale version of a particular Web page yields an incorrect or vacuous response.

FIG. 4 shows a flowchart describing the calculation of the values $d_i$. First, in step 301, the method examines the sample queue to see if a new Web page has arrived but not been processed. If not, control passes to step 302, where the method waits a prescribed time-out period and then returns to step 301. If so, step 303 reads the index value i of the Web page in question. In step 304 the method checks to see if Web page i still exists. If it does, step 305 checks to see if Web page i is current. If it is, the Web page is removed from the sample queue and control passes back to step 301. If it is not, control passes to step 306, where the method reads the client query from the sample queue and removed the Web page from the sample queue. In step 307 the method checks to see if Web page i contains the correct response to the sample query. If it does, step 308 performs exponential smoothing, reducing the value $d_i$ by the exponential smoothing factor D. Specifically, the invention sets $d_i = D d_i + (1-D)$. If in step 304 the method discovered that Web page i no longer exists, control is also passed to step 308. After either step 308 or 309. control is returned to step 301, and the process starts anew. This process does not normally terminate, and the values $d_i$ get updated regularly.

4. Estimating a Generalized Stochastic or Generalized Deterministic Update Process for a Web Page This portion of the invention estimates the various characteristics of the update process for Web page i. Since the generalized deterministic framework is only a special case of the generalized stochastic framework, as previously noted, the initial steps of the invention are completely general and independent of whether the update process for Web page i is generalized stochastic or generalized deterministic. The end of this portion of the invention considers estimates of the specific update process parameters for the generalized stochastic process and generalized deterministic process, respectively.

This invention includes the important notion of "shadow updates" to capture the situation where a update that might occur at a particular point in time does not take place for one of several possible reasons. As a specific example, consider a news service that posts updates to their Web site at regular intervals, say every 30 minutes, but no update actually occurs to the Web page at some of these time epochs on the half hour because there is no additional news to report. In another related example, there might be certain types of updates to the Web site at some of these time epochs on the half hour, but these updates are relatively minor and do not change the results that would be obtained by the search engine mechanisms, and thus from the perspective of the crawling frequency problem no update actually occurs to the Web page. The invention uses the term "shadow updates" to refer to any instance of an update that might happen but does not happen from the perspective of the search engine for any reason.

This invention exploits the hierarchical approach that consists of first identifying the set of shadow updates for each Web page i, then estimating the distribution of the times between real updates and shadow updates, and then estimating the distribution of whether a possible update is real or a shadow. The Web page indexes run over all Web pages of interest to the search engine. Once again, this invention does not explicitly address the issue of how to perform sampling.

The results of each sample for Web page i provide various pieces of information about the page, including the time of the last update to the page. Different sampling patterns and methods are used together with the other elements of this invention and the use of standard methods from probability theory, statistics and data mining to infer the likelihood of multiple updates to page i in between two adjacent instances of sampling the page. This includes standard methods for extracting various types of seasonal behavior at different time scales, such as but not limited to hourly, daily, weekly, monthly and yearly patterns. Shadow updates can also be used together with these methods to capture the possibility of updates in between two real updates to a page obtained from two adjacent instances of sampling the page. A discovery algorithm is used to perform such sampling in an adaptive and sufficiently fine manner to obtain the information required to accurately estimate the various characteristics of the update process for Web page i. This includes probabilistically and adaptively sampling within intervals between the time epochs when two updates are likely to occur.

The information obtained from such sampling of each Web page i is first used to identify the set of real updates and shadow updates for the page, if any. Two equally preferred embodiments are offered. The first is based on the direct use of the sampling results and the second is based on the use of various methods to statistically infer the information of interest from the sampling results Since the first preferred embodiment consists of direct use of the sampling results, the focus is on the hierarchical approach of the second preferred embodiment in what follows. Standard methods from probability theory, statistics and data mining are used to infer the characteristics of these real updates and shadow updates. This includes standard methods for extracting various types of seasonal behavior at different time scales, such as but not limited to hourly, daily, weekly, monthly and yearly patterns. The resulting sequence of updates (real and shadow) for Web page i is then processed by the next step of the hierarchical approach which estimates the distribution of the times between these updates.

A large body of research in the published literature has addressed this problem of accurately fitting a probability distribution or stochastic process to a sequence of data points. Those skilled in the art will recognized that this well-studied and well-addressed problem is orthogonal to the goals of this invention. One particularly effective solution method, based on techniques of maximum likelihood rations and optimization, is called the expectation-maximization algorithm or the EM algorithm. See, for example, *Maximum Likelihood from Incomplete Data vis the EM Algorithm*, Journal of the Royal Statistical Society, 39(B):1-38, 1977, which is incorporated by reference herein in its entirety. It is important to note, however, that our reference to the EM algorithm is for illustrative purposes only, and thus this invention is not limited to the EM algorithm but instead can exploit any method for fitting a probability distribution or stochastic process to a sequence of data points.

As part of this step of the hierarchical approach which uses the EM algorithm, or related methods, a set of statistical tests are performed on the sequence of updates (real and shadow) for Web page i to determine both the characteristics of the updates to the page and the version of the EM algorithm which is used. This includes, but is not limited to, statistical tests of whether the sequence of updates for Web page i: (1) are independent or contain some form of correlation and dependencies; (2) follow a stationary distribution (or process) throughout or contain some time-varying behavior including any correlation with time; (3) contain seasonal behavior at different time scales. Standard methods from probability theory, statistics and data mining are used to perform these and related tests, the results of which determine important characteristics of the update process and the version of the EM algorithm used to estimate its parameters. One of the results of this step of the hierarchical approach is the determination of whether the update process for Web page i is a generalized stochastic process or a generalized deterministic process. Given this determination, the next two subsections consider the details of estimating the parameters of these respective processes as the last step of the hierarchical approach.

Figure 5:
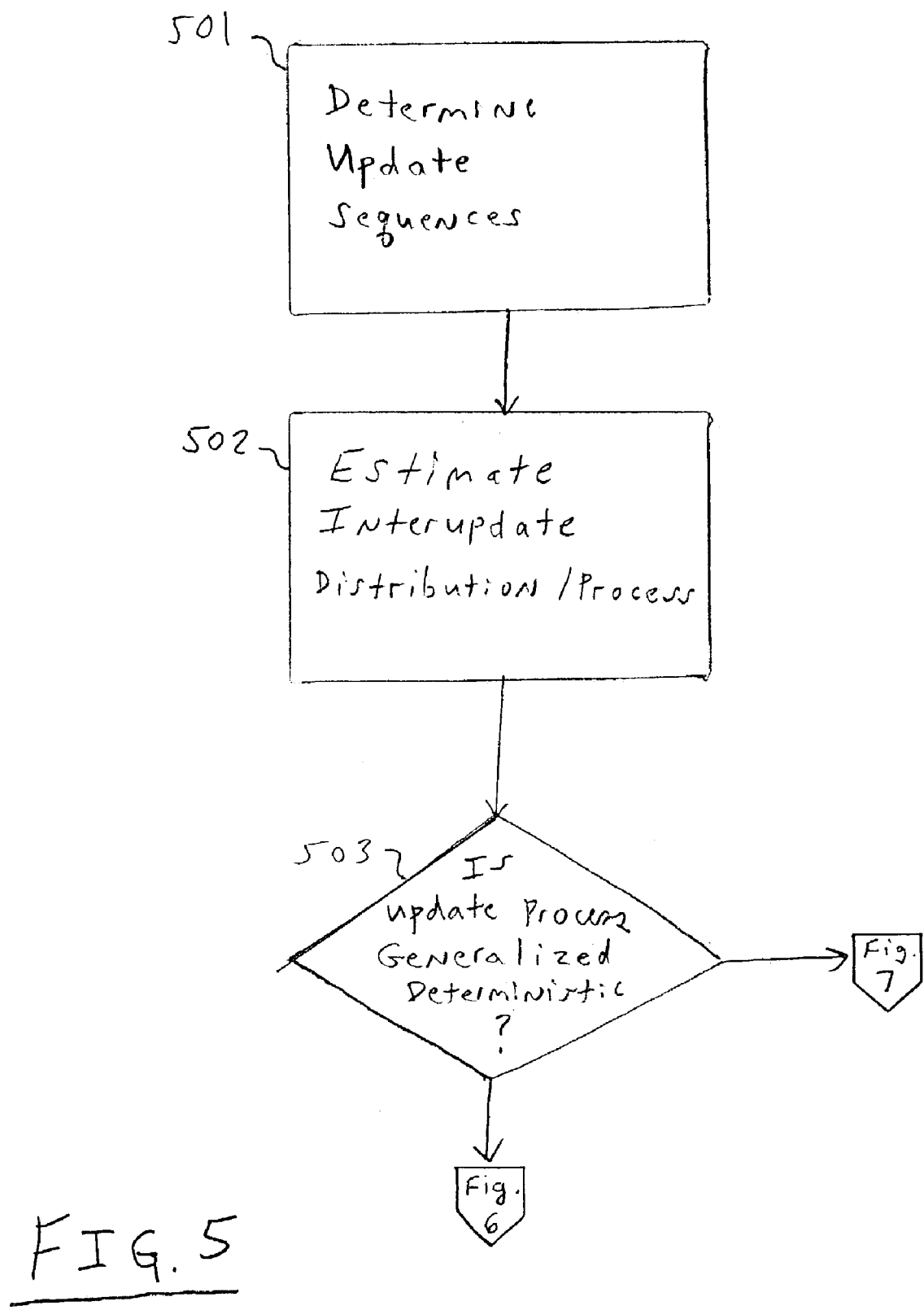
FIG. 5 is a flow diagram outlining an exemplary process of deciding whether a particular Web page is updated according to a generalized stochastic process or according to a generalized deterministic process.
Figure 6:
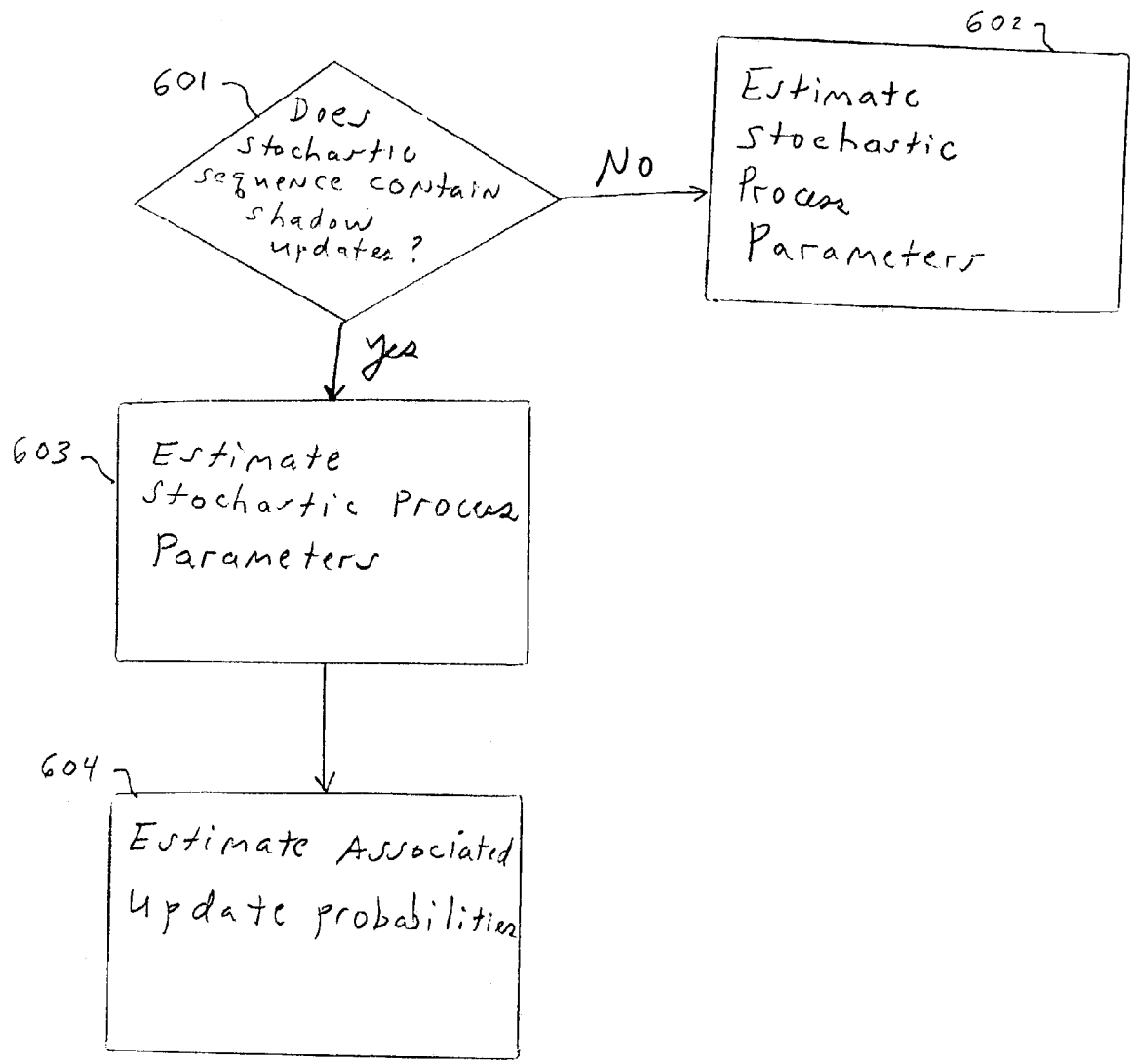
FIG. 6 is a flow diagram outlining an exemplary process for estimating the distribution of the possible update times and corresponding probabilities for a Web page which is updated according to a generalized stochastic process.
Figure 7:
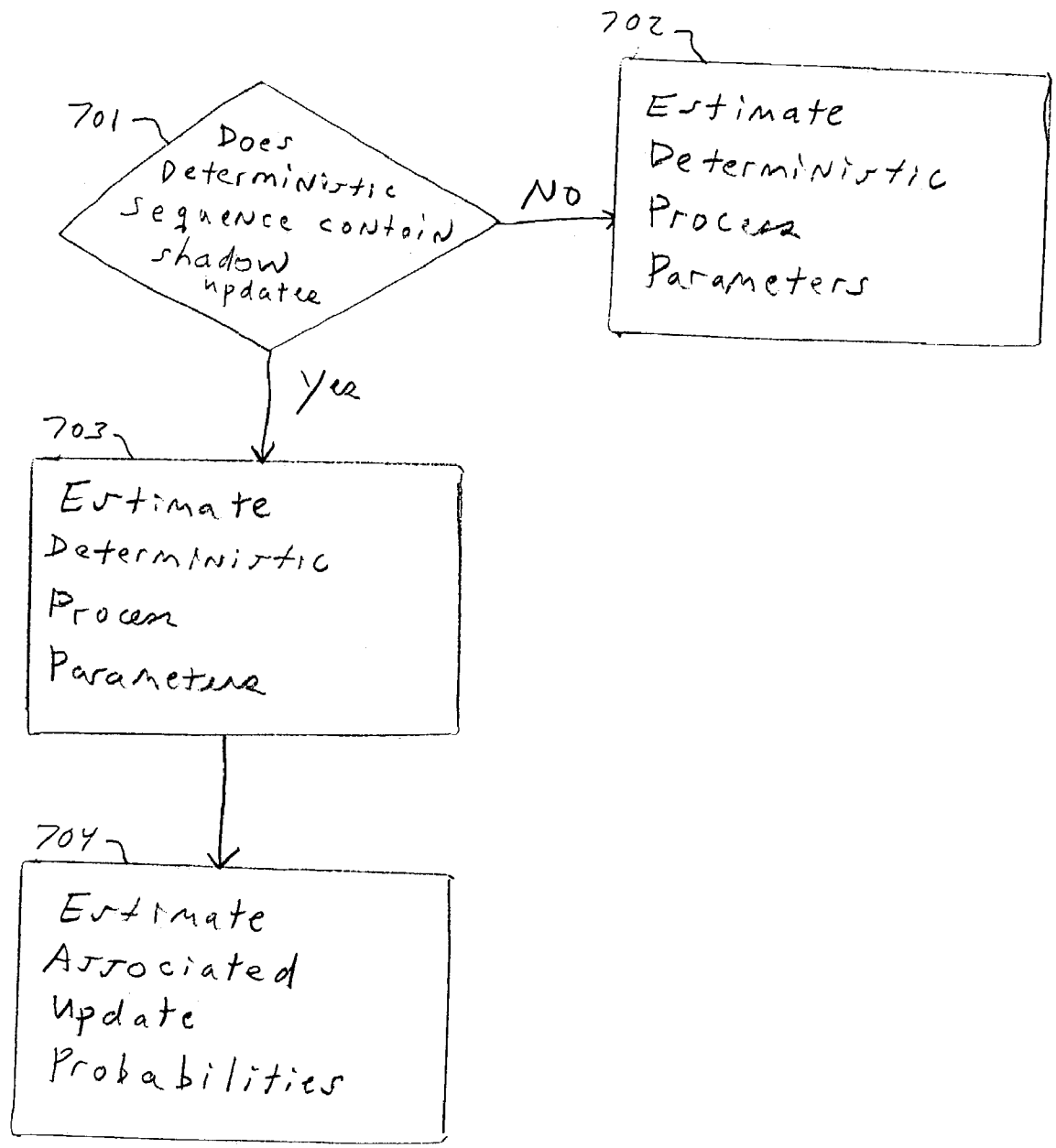
FIG. 7 is a flow diagram outlining an exemplary process for estimating the possible update times and corresponding probabilities for a Web page which is updated according to a generalized deterministic process.

FIG. 5 provides a flowchart that summarizes the hierarchical approach of this invention for estimating a generalized stochastic or generalized deterministic update process for Web page i. First, step 501 determines the sequence of updates for all Web pages i, including both real and shadow updates. In step 502, the probability distribution or stochastic process of the times between real updates and shadow updates are estimated. If the result is a generalized deterministic process, then step 503 leads to the flowchart in FIG. 7; else step 503 leads to the flowchart in FIG. 6.

5. Estimating the Distribution of the Possible Update Times and Corresponding Probabilities for a Generalized Stochastic Web Page The first issue to be addressed is whether the update sequence for Web page i contains shadow updates (step 601). If the answer is "no", then the EM algorithm (or related methods) are used to estimate the parameters of the probability distribution or stochastic process determined in the previous steps of this invention to best match the update sequence for the page and all such updates occur with probably 1 (step 602). Otherwise, in addition to using the EM algorithm (or related methods) to estimate the parameters of the probability distribution or stochastic process determined by previous steps to best match the update sequence (step 603), the invention involves additional steps to determine the probability associated with each update as to whether it is a real update or a shadow update (step 604). This includes a set of statistical tests, analogous to those described above, of whether the real updates: (1) are independent or contain some form of correlation and dependencies; (2) follow a stationary distribution (or process) throughout or contain some time-varying behavior including any correlation with time; (3) contain seasonal behavior at different time scales. Standard methods from probability theory, statistics and data mining are used to perform these and related tests, the results of which determine the probability measure associated with each update.

6. Estimating the Possible Update Times and Corresponding Probabilities for a Generalized Deterministic Web Page Since the generalized deterministic framework is a special case of the generalized stochastic framework, the above steps for the generalized stochastic framework can be used directly but with the understanding that the corresponding interupdate times are deterministic (steps 701 through 704). This yields the sequence of specific times at which updates might occur together with the corresponding update probability.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

Appendix

Denote by N the total number of Web pages to be crawled, which shall be indexed by i. Consider a scheduling interval of length T as a basic atomic unit of decision making. Let R denote the total number of crawls possible in a single scheduling interval.

The time-average staleness denoted by $a_i(t_{i,1}, \ldots, t_{i,x_i})$ is then computed, and the times $t_{i,1}, \ldots, t_{i,x_i}$ are chosen so as to minimize the time-average staleness estimate $a_i(t_{i,1}, \ldots, t_{i,x_i})$, given that there are $x_i$ crawls of Web page i. Denote these optimal times by $a_i(t^*_{i,1}, \ldots, t^*_{i,x_i})$. Define the function $A_i$ by setting $$A_i(x_i) = a_i(t^*_{i,1}, \ldots, t^*_{i,x_i}) \tag{A1}$$

Thus, the domain of this function $A_i$ is the set $\{0, \ldots, R\}$.

The first goal is to minimize the objective function $$\sum_{i=1}^{N} w_i A_i(x_i) \tag{A2}$$

subject to the constraints $$\sum_{i=1}^{N} x_i = R \tag{A3}$$

$$x \in \{m_i, \ldots, M_i\}. \tag{A4}$$

Here the weights $w_i$ will determine the relative importance of each Web page i. Specifically, $w_i$ is referred to as the embarrassment metric, because it measures the likelihood that the client will discover that the search engine has incorrectly responded to a query. The non-negative integers $m_i \leq M_i$ represent the minimum and maximum number of crawls possible for Web page i. They could be 0 and R respectively, or any values in between. Practical considerations will dictate these choices. The remaining goals depend entirely on the output of the first goal.

Thus, accurate computations of $w_i$ and $a_i$ are required in order to be effective.

Specifically, the following is computed:

$$w_i = d_i \sum_j \sum_k c_{j,k} b_{i,j,k} \tag{A5}$$

where
  the value $b_{i,j,k}$ denotes the probability that the search engine will return Web page i in position j of query result page k,
  the value $c_{j,k}$ denotes the frequency that a client will click on a returned Web page in position j of query result page k, and
  the value $d_i$ denotes the probability that a query to a stale version of Web page i yields an incorrect or vacuous response.

For a generalized stochastic Web page i, the following is computed:

$$a_i(t_{i,1}, \ldots, t_{i,x_i}) = \tag{A6}$$

-continued $$\frac{1}{T} \sum_{j=0}^{x_i} \int_{t_{i,j}}^{t_{i,j+1}} \left( \int_0^{\infty} \left( 1 - \frac{\overline{G}(t - t_{i,j} + v)}{\overline{G}_i(v)} \right) g B_i^u(v) dv \right) dt$$

where $\overline{G}_i(t) \equiv 1 - G_i(t)$ denotes the tail of the joint distribution of the interupdate times for Web page i and the corresponding update probability, $n \in N$, which can be completely general and contain all forms of dependencies, and $gB_i^u(\cdot)$ is the density function for the corresponding backward reference time. This then reduces to $$a_i(t_{i,1}, \ldots, t_{i,x_i}) = \frac{1}{T} \sum_{j=0}^{x_i} \int_{t_{i,j}}^{t_{i,j+1}} \left( 1 - \lambda_i \int_0^{\infty} \overline{G}(t - t_{i,j} + v) dv \right) dt \tag{A7}$$

under the assumptions of independent and identically distributed update times that occur with probability 1, where $\lambda_i$ denotes the update frequency for Web page i, and reduces further to $$a_i(t_{i,1}, \ldots, t_{i,x_i}) = 1 + \frac{1}{\lambda_i T} \sum_{j=0}^{x_i} \left( e^{-\lambda_i(t_{i,j+1} - t_{i,j})} - 1 \right) \tag{A8}$$

under the additional assumptions that these interupdate time distributions are exponential. It should be noted that the invention is not limited to any of these simplifications which are included solely for illustrative purposes.

For a generalized deterministic Web page i, it is only valuable to consider crawling at the possible update times $u_{i,1}, \ldots, u_{i,Q_i}$. So writing $$y_{i,j} = \begin{cases} 1, & \text{if a crawl occurs at time } u_{i,j}; \\ 0, & \text{otherwise.} \end{cases} \tag{A9}$$

one can change the notation slightly and consider the term $a_i$ to be a function of $y_{i,0}, \ldots, y_{i,Q_i}$ instead. If there are $x_i$ crawls, then $$\sum_{j=0}^{Q_i} y_{i,j} = x_i.$$

The invention then computes $$\overline{a}(y_{i,0}, \ldots, y_{i,Q_i}) = \sum_{j=0}^{Q_i} u_{i,j} \left[ 1 - \prod_{k=J_{i,j}+1}^{j} (1 - k_{i,j}) \right] \tag{A10}$$

What is claimed is:

1. A computer-implemented method for Web crawler data collection to assist a search engine in deciding on the optimal crawling frequencies and the optimal times to crawl each Web page, comprising the steps of:

collecting information associated with a plurality of queries, wherein the information relates to results of the queries or responses to the queries or both results of and responses to the queries;

using the collected information to determine a return probability $b_{i,j,k}$ that the search engine will return a Web page i in a position j of query result page k, wherein the return probability $b_{i,j,k}$ is determined by estimating a temporary return probability $Tb_{i,j,k}$ and then updating an existing return probability $b_{i,j,k}$ using a smoothing process; and using the collected information to determine an incorrect response probability $d_i$ relating to the probability that a query to a stale version of a particular Web page i yields an incorrect or vacuous response, wherein determining an incorrect response probability $d_i$ comprises:

determining that a Previously Presented Web page i is in a sample queue that has not been processed;

reading an index value i of the Web page i and determining if the Web page i exists;

when the Web page exists, determining if the Web page is current;

when the Web page i is not current, reading a client query from the sample queue and determining if the Web page i contains a correct response to the client query; and when the Web page i does not contain a correct response to the client query, updating $d_i = D \cdot d_i + (1-D)$, where D is a smoothing parameter.

2. The method of claim 1, further comprising the step of collecting information about the characteristics and update time distributions of a plurality of Web pages.

3. The method of claim 2, wherein the characteristics includes whether a Web page update process is generalized stochastic or generalized deterministic in nature.

4. The method of claim 2, wherein the update time distributions includes a probability distribution.

5. The method of claim 2, wherein the update time distributions includes a sequence of specific times at which updates might occur together with a corresponding update probability.

6. The method of claim 1, wherein updating an existing return probability $b_{i,j,k}$ using a smoothing process comprises:
normalizing the temporary return probability $Tb_{i,j,k}$; and
determining A*(existing return probability $b_{i,j,k}$)+(1−A)* (normalized $Tb_{i,j,k}$), where A is a smoothing parameter.

7. The method of claim 1, further comprising using the collected information to determine a clicking probability $c_{j,k}$ relating to a frequency with which a client selects a returned Web page i in a particular position j of a particular query result k, wherein the clicking probability $c_{j,k}$ is determined by estimating a temporary clicking probability $Tc_{j,k}$ and then updating an existing clicking probability $c_{j,k}$ using a smoothing process.

8. The method of claim 7, wherein updating an existing clicking probability $c_{j,k}$ using a smoothing process comprises determining B*(existing clicking probability $c_{j,k}$)+(1−B)* ($Tc_{j,k}$), where B is a smoothing parameter.

9. The method of claim 1, wherein the collected information is sampled information.

10. The method of claim 1, further comprising using the collected information to determine a clicking probability $c_{j,k}$ relating to a frequency with which a client selects a returned Web page i in a particular position j of a particular query result k, wherein the clicking probability $c_{j,k}$ is determined at least in part on a model wherein the model determines an estimate of the clicking probabilities at least in part using a modified Zipf's Law distribution.

11. The method of claim 1, further comprising updating $d_i = D \cdot d_i$ when the Web page i does not exist or when the Web page i does contain a correct response to the client query.

12. A computer-implemented method for Web crawler data collection to assist a search engine in deciding on the optimal crawling frequencies and the optimal times to crawl each Web page, comprising the steps of:

collecting information associated with a plurality of queries, wherein the information relates to results of the queries or-responses to the queries or both results and responses to the queries;

using the collected information to determine a clicking probability $c_{j,k}$ relating to a frequency with which a client selects a returned Web page i in a particular position j of a particular query result k, wherein the clicking probability $c_{j,k}$ is determined by estimating a temporary clicking probability $Tc_{j,k}$ and then updating an existing clicking probability $c_{j,k}$ using a smoothing process; and using the collected information to determine an incorrect response probability $d_i$ relating to the probability that a query to a stale version of a particular Web page i yields an incorrect or vacuous response, wherein determining an incorrect response probability $d_i$ comprises:

determining that a Previously Presented Web page i is in a sample queue that has not been processed;

reading an index value i of the Web page i and determining if the Web page i exists;

when the Web page exists, determining if the Web page is current;

when the Web page i is not current, reading a client query from the sample queue and determining if the Web page i contains a correct response to the client query; and when the Web page i does not contain a correct response to the client query, updating $d_i = D \cdot d_i + (1-D)$, where D is a smoothing parameter.

13. A computer-implemented method for Web crawler data collection to assist a search engine in deciding on the optimal crawling frequencies and the optimal times to crawl each Web page, comprising the steps of:

collecting information associated with a plurality of queries, wherein the information relates to results of the queries or responses to the queries or both results of and responses to the queries; and using the collected information to determine to determine an incorrect response probability $d_i$ relating to the probability that a query to a stale version of a particular Web page i yields an incorrect or vacuous response, wherein the incorrect response probability is determined by:

determining that a Previously Presented Web page i is in a sample queue that has not been processed;

reading an index value i of the Web page i and determining if the Web page i exists;

when the Web page exists, determining if the Web page is current;

when the Web page i is not current, reading a client query from the sample queue and determining if the Web page i contains a correct response to the client query; and when the Web page i does not contain a correct response to the client query, updating $d_i = D \cdot d_i + (1-D)$, where D is a smoothing parameter.

14. The method of claim 13, further comprising updating $d_i = D \cdot d_i$ when the Web page i does not exist or when the Web page does contain a correct response to the client query.

* * * * *